United States Patent
Nagai et al.

(10) Patent No.: US 10,241,519 B2
(45) Date of Patent: Mar. 26, 2019

(54) AUTO VALET PARKING SYSTEM AND METHOD

(71) Applicant: HITACHI, LTD., Tokyo (JP)

(72) Inventors: Toru Nagai, Tokyo (JP); Atsushi Katou, Tokyo (JP); Yoshitaka Atarashi, Tokyo (JP); Mariko Okude, Tokyo (JP)

(73) Assignee: HITACHI, LTD., Tokyo (JP)

( * ) Notice: Subject to any disclaimer, the term of this patent is extended or adjusted under 35 U.S.C. 154(b) by 58 days.

(21) Appl. No.: 15/450,066

(22) Filed: Mar. 6, 2017

(65) Prior Publication Data

US 2017/0285654 A1 Oct. 5, 2017

(30) Foreign Application Priority Data

Mar. 29, 2016 (JP) ................. 2016-065498

(51) Int. Cl.
*G05D 1/02* (2006.01)
*B60W 30/06* (2006.01)
(Continued)

(52) U.S. Cl.
CPC ........... *G05D 1/0274* (2013.01); *B60W 30/06* (2013.01); *B62D 15/0285* (2013.01);
(Continued)

(58) Field of Classification Search
CPC ... G05D 1/0274; G05D 1/0212; B60W 30/06; B62D 15/0285; G06Q 10/1097; G08G 1/141
(Continued)

(56) References Cited

U.S. PATENT DOCUMENTS

| 2002/0171562 A1* | 11/2002 | Muraki | G08G 1/14 340/932.2 |
| 2003/0074129 A1* | 4/2003 | Curbow | G01C 21/26 701/523 |

(Continued)

FOREIGN PATENT DOCUMENTS

| DE | 10 2013 213 379 A1 | 1/2015 |
| JP | 2006-182152 A | 7/2006 |
| JP | 2008-009913 A | 1/2008 |

OTHER PUBLICATIONS

The Extended European Search Report dated Jul. 28, 2017 for the EP Application No. 17159805.5.
(Continued)

*Primary Examiner* — Gertrude Arthur Jeanglaude
(74) *Attorney, Agent, or Firm* — Volpe and Koenig, P.C.

(57) ABSTRACT

An auto valet parking system operates a car in a parking lot and including: a parking lot map database which manages route information to each parking space; a vacant space information database which manages full and vacant information for each parking space; a facility migration information database which accumulates facility migration information indicative of behaviors of a parking lot user; a first unit which detects the full and vacant information for each parking space, searches for a route to the parking space and automatically parks the car in the parking space based on the route information; a second unit notifies the parking lot user of information on a parking position through a mobile terminal; and a third unit which searches for the vacant space as close as possible to conditions based on the facility migration information, and reflects the vacant space on the first unit.

10 Claims, 10 Drawing Sheets

(51) Int. Cl.
   *B62D 15/02* (2006.01)
   *G06Q 10/10* (2012.01)
   *G08G 1/14* (2006.01)
   *G06Q 10/02* (2012.01)
   *G06Q 10/04* (2012.01)

(52) U.S. Cl.
   CPC ........... *G05D 1/0212* (2013.01); *G06Q 10/02* (2013.01); *G06Q 10/043* (2013.01); *G06Q 10/1097* (2013.01); *G08G 1/141* (2013.01); *G08G 1/143* (2013.01); *G08G 1/144* (2013.01); *G08G 1/146* (2013.01)

(58) Field of Classification Search
   USPC ....................................................... 701/23, 36
   See application file for complete search history.

(56) References Cited

U.S. PATENT DOCUMENTS

| | | |
   |---|---|---|
   | 2005/0033634 A1 | 2/2005 | Pugliese, III |
   | 2006/0250278 A1* | 11/2006 | Tillotson .................. G08G 1/14 340/932.2 |
   | 2008/0033769 A1 | 2/2008 | Koorapati et al. |
   | 2010/0156672 A1 | 6/2010 | Yoo et al. |
   | 2012/0188100 A1 | 7/2012 | Min et al. |
   | 2013/0231824 A1 | 9/2013 | Wilson et al. |
   | 2014/0072178 A1* | 3/2014 | Carbonell .......... G06K 9/00785 382/105 |
   | 2015/0346727 A1 | 12/2015 | Ramanujam |
   | 2016/0371982 A1 | 12/2016 | Arndt et al. |

OTHER PUBLICATIONS

News Release 2013, "Overview of Honda Exhibit at the 20th ITS World Congress Tokyo 2013," Honda Worldwide, Oct. 8, 2013, 2 pgs., <<http://world.honda.com/news/2013/4131008eng.html>>.
European Office Action dated Aug. 8, 2018 for the European Patent Application No. 17159805.5.

* cited by examiner

FIG. 9

| USER | FACILITY No. | PARKING POSITION | ENTERING TIME | EXITING TIME | STAYING TIME |
|---|---|---|---|---|---|
| A | 1 | 3F-56 | hh:mm:ss | hh:mm:ss | hh:mm:ss |
| | 5 | 2F-15 | hh:mm:ss | hh:mm:ss | hh:mm:ss |
| | 3 | 3F-22 | hh:mm:ss | hh:mm:ss | hh:mm:ss |
| | 8 | 2F-08 | hh:mm:ss | hh:mm:ss | hh:mm:ss |
| | 6 | 1F-32 | hh:mm:ss | hh:mm:ss | hh:mm:ss |
| | 4 | 1F-75 | hh:mm:ss | hh:mm:ss | hh:mm:ss |
| B | 3 | 2F-21 | hh:mm:ss | hh:mm:ss | hh:mm:ss |
| | 2 | 2F-43 | hh:mm:ss | hh:mm:ss | hh:mm:ss |
| | 6 | 3F-31 | hh:mm:ss | hh:mm:ss | hh:mm:ss |
| | 4 | 1F-18 | | | |
| .. | .. | .. | .. | .. | .. |
| .. | .. | .. | .. | .. | .. |
| .. | .. | .. | .. | .. | .. |

AUTO VALET PARKING SYSTEM AND METHOD

CLAIM OF PRIORITY

The present application claims priority from Japanese patent application JP 2016-065498 filed on Mar. 29, 2016, the content of which is hereby incorporated by reference into this application.

BACKGROUND OF THE INVENTION

1. Field of the Invention

The present invention relates to an auto valet parking system and a method thereof capable of automatically parking a car in a vacant space and parking the car in the vicinity of an exiting position from facility of a facility user.

2. Description of the Related Art

In general, when a parking lot user does not have a vacant parking space where the user wants to use, the user searches for a nearby parking space as close as possible and then parks a car. However, when migrating in a plurality of facilities, in many cases, the parking space in which the car is parked is away from the current position at which the user is finally present.

In response to such a problem, JP 2008-009913 discloses that "when searching for a route of a proper parking position to a first destination specified by automatic driving, if a parking position which seems to be proper is not found, the user searches for a second candidate place which seems to be proper and then parks a car."

According to the method described in JP-2006-182152-A, a car can secure a parking position near a predetermined exiting position, and if the best position cannot be secured, it is possible to secure the next best position. However, when the planned behaviors of the parking lot user changes, it is assumed that the secured parking position is not necessarily a position with high convenience for the parking lot user.

The present invention has been made to solve such a problem, and an object thereof is to allow a user to park a car in a parking space near the user's current position without waiting too much, in a complex facility which is additionally provided with an indoor large-scale multi-story parking lot such as a shopping mall, when the parking lot user goes home after going around the facility, even when finishing the shopping and holding a big baggage.

SUMMARY OF THE INVENTION

Therefore, in the present invention, an auto valet parking system for operating a car in a parking lot attached to a facility includes: a parking lot map database which manages route information to each parking space inside the parking lot; a vacant space information database which manages full and vacant information for each parking space; a facility migration information database which accumulates facility migration information indicative of behaviors of a parking lot user in the facility; a first unit which detects the full and vacant information for each parking space, searches for a route to the parking space and automatically parks the car in the parking space based on the route information to the searched parking position; a second unit which notifies the parking lot user of information on a parking position through a mobile terminal; and a third unit which searches for the vacant space as close as possible to conditions based on the facility migration information of the parking lot user, and reflects the vacant space on the first unit.

Further, in the present invention, there is provided an auto valet parking method for operating a car in a parking lot additionally provided in a facility, the method including: holding a parking lot map database which manages route information to each parking space inside the parking lot, a vacant space information database which manages full and vacant information for each parking space, and a facility migration information database which accumulates facility migration information indicative of behaviors of a parking lot user in the facility; a first step which detects the full and vacant information for each parking space, searches for a route to the parking space and automatically parks the car in the parking space based on the route information to the searched parking position; a second step which notifies the parking lot user of information on a parking position through a mobile terminal; and a third step which searches for the vacant space as close as possible to conditions based on the facility migration information of the parking lot user, and reflects the vacant space on the first step.

In the present invention, a vacant space is searched and automatic parking is performed based on the current position and usage purpose information of the parking lot user. Further, in the embodiment of the present invention, it is determined whether there is a leavable position in the roads around the parking lot and the inside passage, and the determination is notified to the parking lot user. As a result, when the parking lot user goes home after going around the facility, since it is possible to get on the parked car from the vicinity of the current position, the convenience of the parking lot is improved.

BRIEF DESCRIPTION OF THE DRAWINGS

FIG. 9 is a diagram illustrating an example of user facility migration information.

DESCRIPTION OF THE PREFERRED EMBODIMENTS

Embodiments of the present invention will be described below with reference to the drawings.

Embodiment

Figure 1:
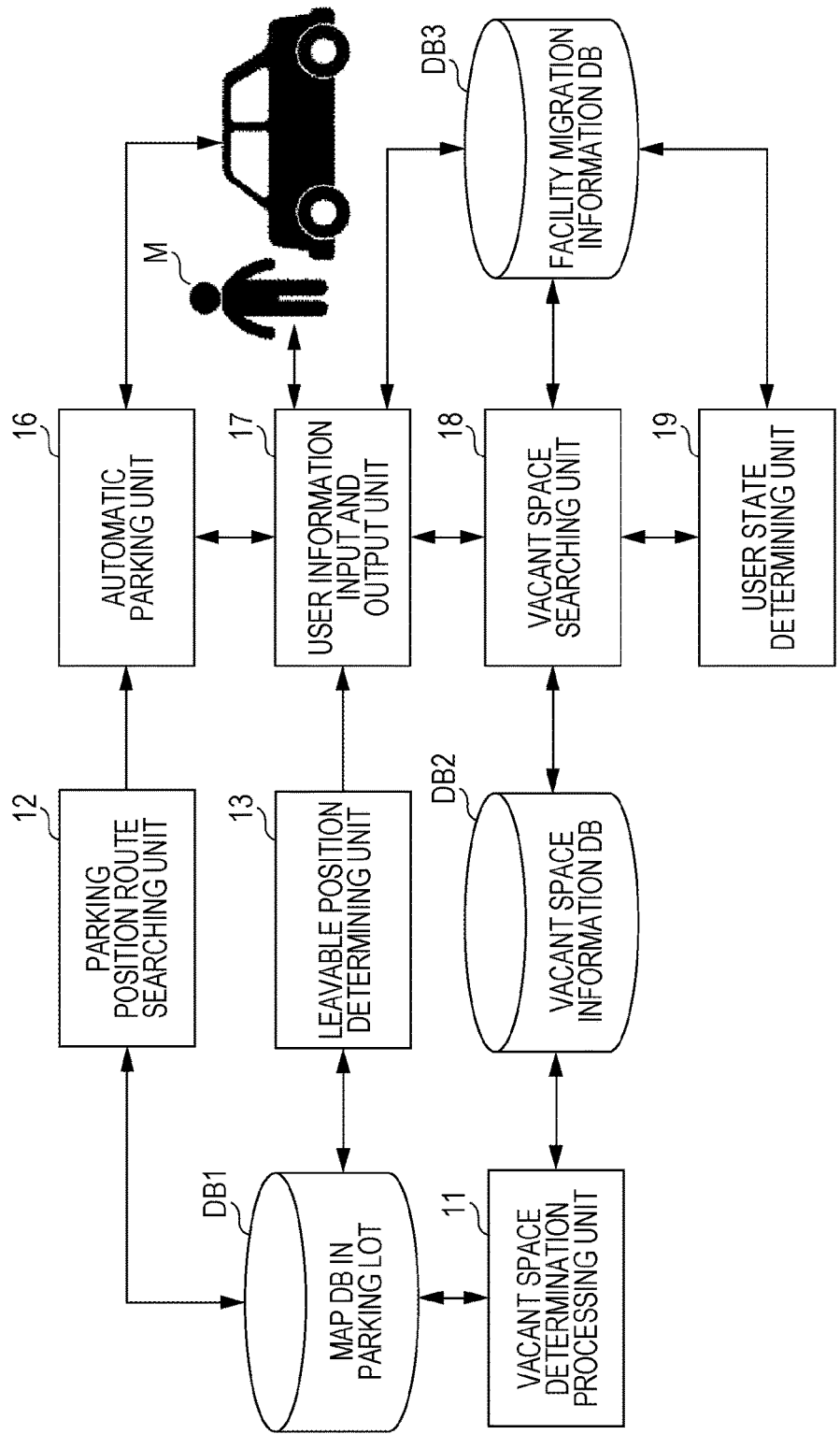
FIG. 1 is a diagram illustrating a hardware configuration of an auto valet parking system mounted on a car.

FIG. 1 is a diagram illustrating a hardware configuration of an auto valet parking system mounted on a car.

The auto valet parking system illustrated in FIG. 1 includes a plurality of database DB and a plurality of arithmetic processing units. Among them, the database DB includes a parking lot map database DB1 which manages route information from a parking lot entrance to each parking space inside the parking lot, a vacant space information database DB2 which manages full and vacant information of each parking space, and a facility migration information database DB3 in which facility migration information of the parking lot user is accumulated in a reusable format.

Further, the arithmetic processing unit includes a vacant space determination processing unit 11 which detects the full and vacant information for each parking space, a parking position route searching unit 12 which searches for a route to a parking space, a leavable position determination unit 13 which determines whether it is possible to leave a car on a road around the parking lot, an automatic parking unit 16 which automatically parks a car at the parking position on the basis of the route information defined by the parking position route searching unit 12, a user information input/output unit 17 which notifies the parking lot user of a current parking position, a vacant space searching unit 18 which searches for a vacant space as close as possible to the request condition of the parking lot user, and a use state determination unit 19 which collects the current user status information of the parking lot user. The parking lot user M inputs necessary information via the user information input/output unit 17 or receives the instruction of the necessary information. The user information input/output unit 17 may be provided inside the car or may use a mobile terminal.

Figure 2:
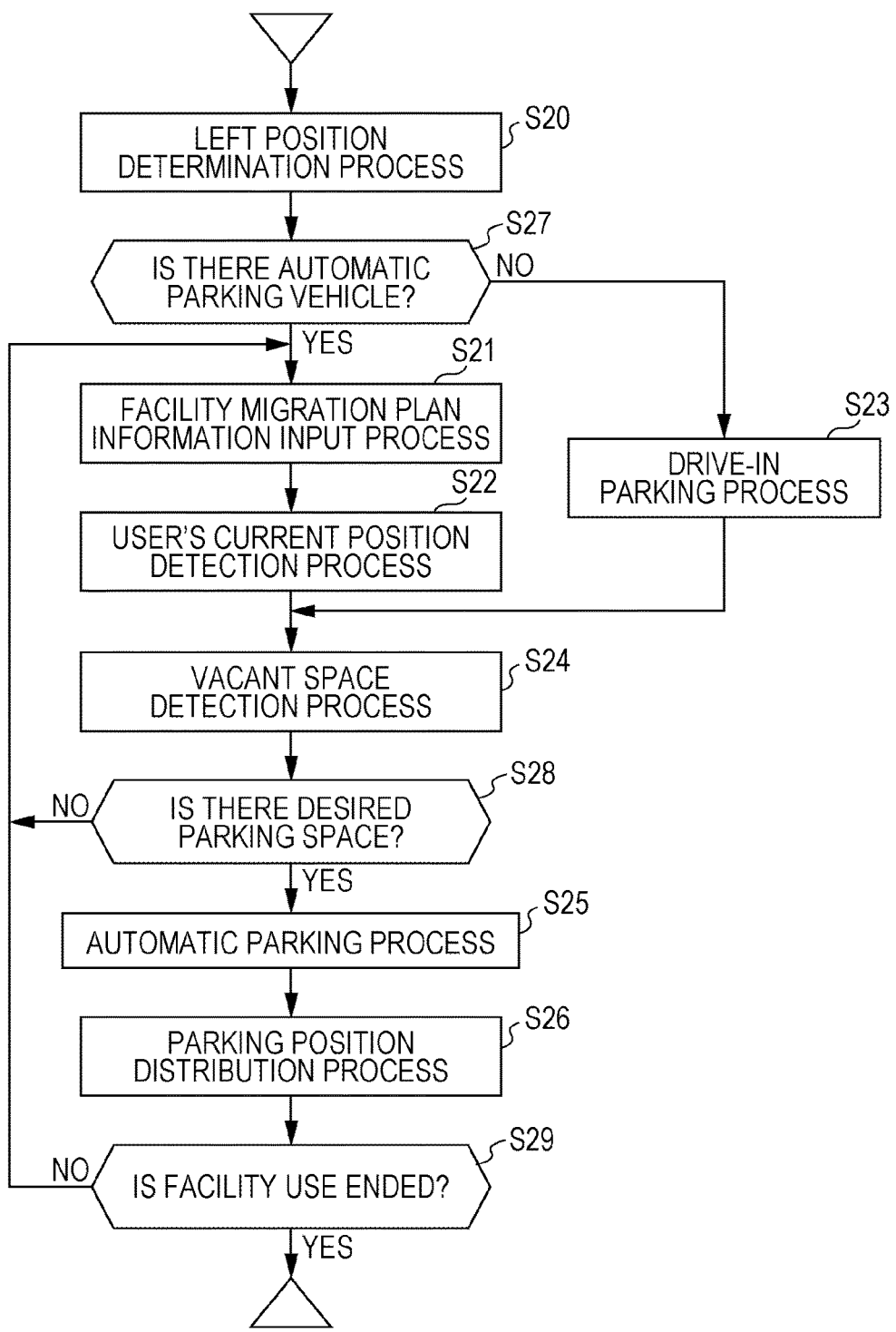
FIG. 2 is a flowchart illustrating a software configuration of the auto valet parking system mounted on the car.

FIG. 2 is a flowchart illustrating the software configuration of the auto valet parking system mounted on the car. The process flow of FIG. 2 will be described below.

In a first processing step S20 of FIG. 2, an exiting position determination process is performed. Here, when a parking queue is generated at the time when the parking lot user approaches a desired parking facility, the car equipped with the automatic parking function inquires of the center whether it is possible to leave the car via a navigation terminal or a mobile terminal such as a smartphone at that point, and the center makes a determination and notifies it to the parking lot user.

In a processing step S27, it is determined whether there is a car equipped with the automatic parking function. If there is a car equipped with the automatic parking function, the process proceeds to a processing step S21. If there is not a car which is not equipped with the automatic parking function, the process proceeds to a processing step S23. In the processing step S23, a car not equipped with the automatic parking function receives the vacant space information satisfying the condition from the center and then parks drive-in parking on the basis of the predetermined migration information.

In the process of the processing step S21 in the case of a car equipped with the automatic parking function, next, when it is determined whether a parking lot user M migrates in the route such as a plurality of parking facilities in advance, the information is input and transmitted to the center. The information on the migration route of the parking facility is given in advance from the user information input/output unit 17 of FIG. 1, and is held in the facility migration information database DB3 which stores the facility migration information of the parking lot user in a reusable format.

In the process of the processing step S22, the current position of the user, for example, information on which facility is a user present is detected. The process of the next processing step S24 is executed after finishing the process of the processing step S22 in the case of the car equipped with the automatic parking function or after finishing the drive-in parking process of the processing step S23 in the case where the car is not equipped with the automatic parking function. The center searches the closest vacant space on the basis of the current position detection information of the facility user M, and the found vacant space information is presented to the facility user M. In response thereto, the facility user M checks the information displayed on the mobile terminal or the like, and replies whether or not the presented parking position is acceptable.

In the process of the processing step S28, the reply content is checked, and in the case of the desired parking space, the process proceeds to the processing step S25. When there is no desired parking space, the process shifts to the process of the processing step S21 to repeatedly execute the searching process of the vacant space again.

If the presented vacant space meets the desire of the parking lot user, in the process of processing step S25, the automatic parking is performed in the vacant space. Here, the automatic parking may be performed after finding a vacant space at the center and notifying it to the parking lot user, or the automatic parking may be performed after notifying to and checking by the parking lot user. However, it is necessary to notify the parking lot user of the parking position information on the place on which the car is parked after the automatic parking. In the process of the processing step S26, the parking position distribution process is executed.

The aforementioned series of processes may be finished once the parking is completed or readjustment may be repeated depending on the movement situation of the facility user, but the facility usage termination is finally checked in the processing step S29.

Figure 3:
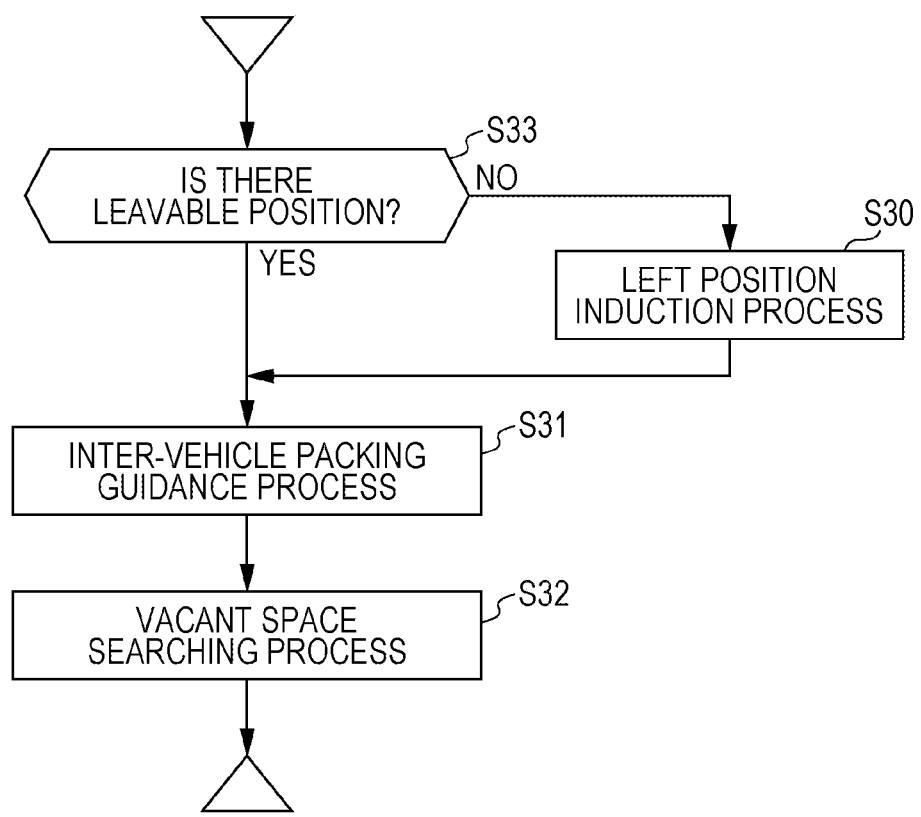
FIG. 3 is a flowchart illustrating software for parking a left car in a desired vacant space.

Next, parking of the left car in a desired vacant space will be described using the process flow of FIG. 3. In the process of the first processing step S33 of FIG. 3, it is determined whether the current traveling location is a leavable position. When there is a leavable position, the process of processing step S31 is performed. When there is no leavable position, the process of processing step S30 is performed. In the process of the processing step S30, the center guides the car to the leavable position.

Next, after being guided to the leavable position by the process of the processing step S30, or when it is checked that the current traveling location is a leavable position in the process of the processing step S33, the process of the processing step S31 is performed. In the process of the processing step S31, when the left cars form a queue, since cars equipped with the automatic parking function and cars not equipped with the automatic parking function coexist in the queue, there is a concern of variation on the distance between the cars. Accordingly, for example, the cars with vacant spaces are guided to pack by the use of a monitoring camera or the like.

Meanwhile, from each parking lot user M in the queue, the desired vacant space search condition is input to the center, the center searches for the vacant space suitable for the conditions desired by the parking lot user as much as possible, and the search result is presented to the parking lot user. However, when a desired parking space is not found, nearby parking spaces in which some parking lot users are currently present are searched for as candidates, the searched result is notified to the parking lot user. When there is a desired vacant space, the center extracts route information to the vacant space starting from the current position from the parking lot map database DB1, and the route information is provided to the automatic parking car, and the car is automatically parked in the vacant space. The vacant space searching process is executed in the processing step S32.

Figure 4:
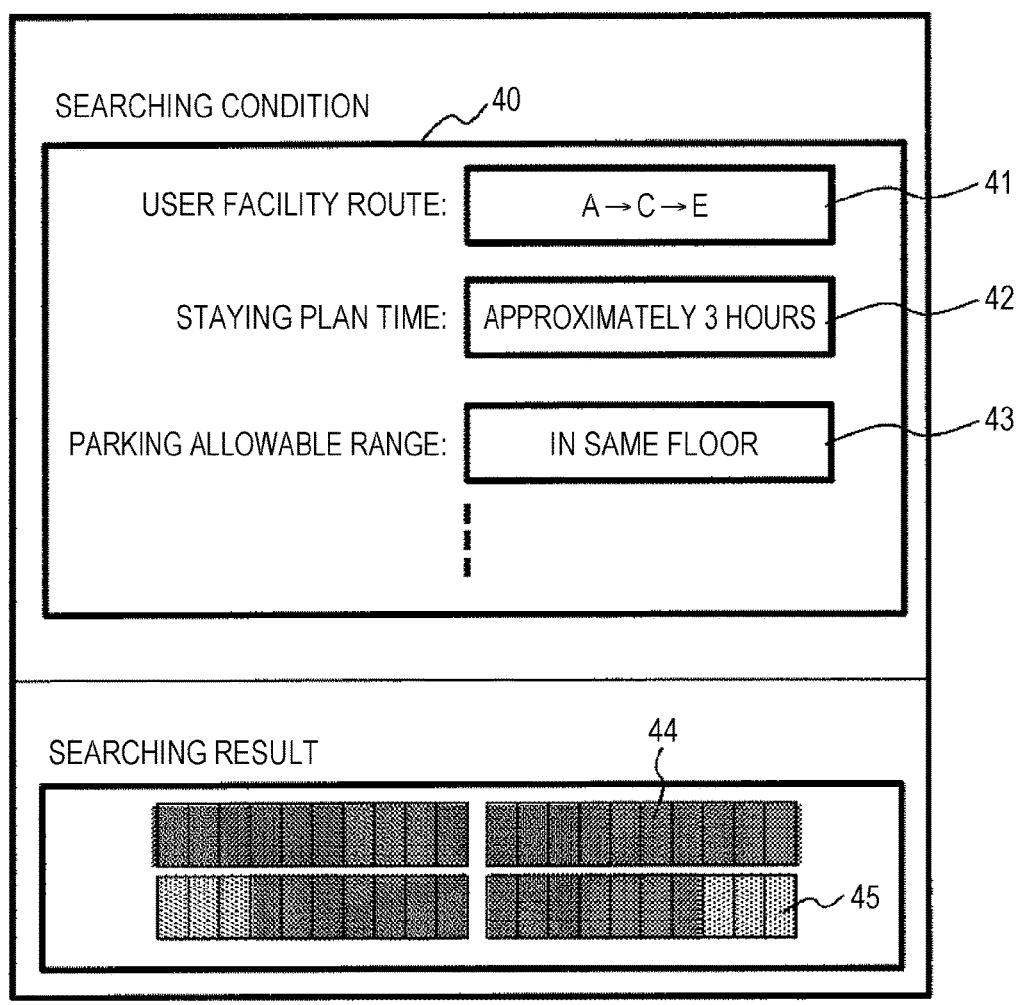
FIG. 4 is a diagram illustrating an input example and a search result of a vacant space search condition.

FIG. 4 is a diagram illustrating an input example and a searching result of the vacant space searching condition. As the parking space condition 40 desired by the parking lot user, for example, searching conditions such as a user facility migration route 41, a staying plan time 42 and a parking acceptable range 43 are considered. Among them, the user facility migration route 41 may be conclusive information or scheduled information, and can be searched by sequentially changing. Further, the staying plan time 42 may be a total staying time of all the utility facility or the staying time for each utility facility, but it is preferable to input the detailed information in order to park the car near the user's current position as close as possible. It is desirable that the parking acceptable range 43 is near the current position of the parking lot user, but if it is not possible, by inputting information on whether the parking lot user can accept how far it is away from the current position of the parking lot user as a condition, it is possible to search for a parking space which satisfies the conditions. For example, it is desirable to input specific conditions, such as being acceptable in the same floor or being acceptable within ±one floor.

In the lower part of FIG. 4, a display example of search results is illustrated. A search result with a radius within ○○ m is displayed by superimposing search results on map information in the parking lot. For example, it is desirable to display the search result to be easily understood to the user, such as displaying a vacant space as 45 and a present car space as 44.

Figure 5:
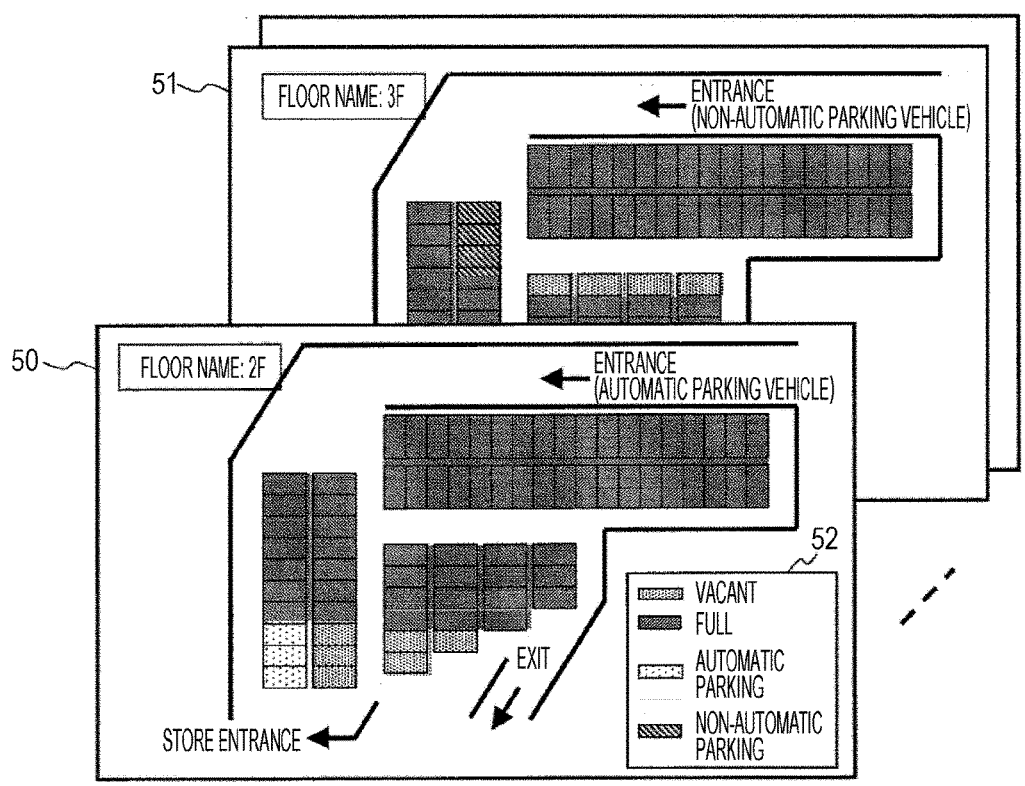
FIG. 5 is a diagram illustrating an example of a parking method at the time of automatic parking.

FIG. 5 is a diagram illustrating an example of a parking method at the time of the automatic parking. In the parked cars, cars equipped with automatic parking function and cars not equipped with automatic parking function coexist. However, in order to improve interference or parking efficiency in the parking lot, for example, in the case of a multi-story parking lot, by setting a 2F floor 50 as a space in which the cars equipped with automatic parking function can be exclusively parked, and by setting a 3F floor 51 as a space in which cars not equipped with automatic parking function can be exclusively parked, it is possible to expect a reduction of the contact accidents caused by interference. The information on the car situations for each parking space can also be distributed to the parking lot user from the center through a mobile terminal such as a car navigation system or a smartphone by distinctively displaying the state, for example, as in legend 52.

Figure 6:
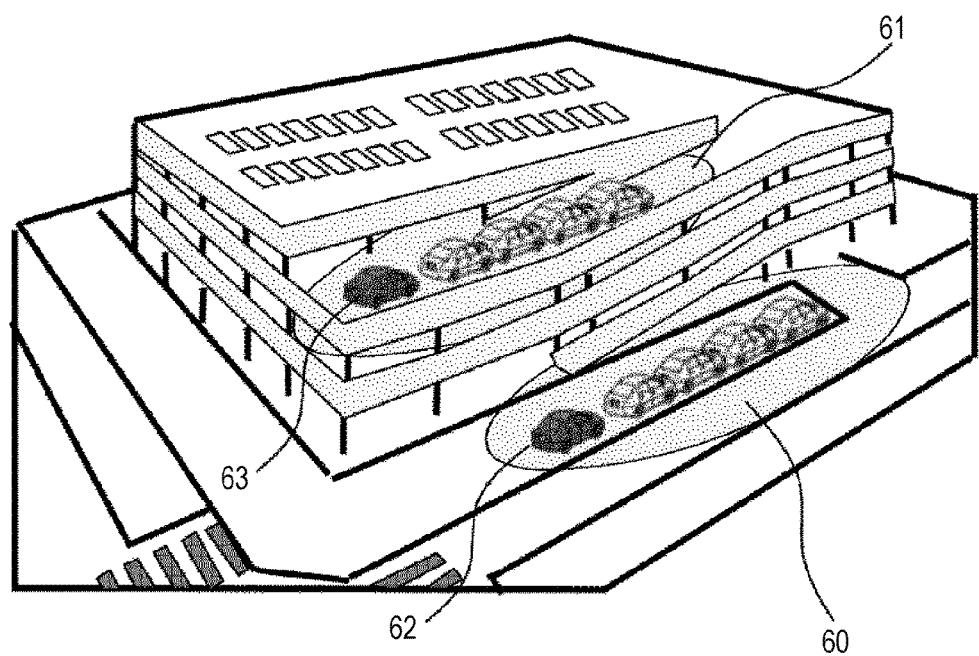
FIG. 6 is a diagram illustrating an example of leaving a car in a multi-level parking lot.

FIG. 6 is a diagram illustrating an example of leaving a car in a multi-story parking lot. In the case of determining the position where it is possible to leave the car in the multi-story parking lot, the traveling location information 62 and 63 of the point where the parking standbys 60 and 61 are generated and transmitted to the center, and are asked to make determination whether or not it is possible to leave the car. As a determination method, for example, it is possible to consider determination whether a public road is a driveway that is a road additionally provided in a parking lot, and permission of leaving the car in the case of a driveway.

Figure 7:
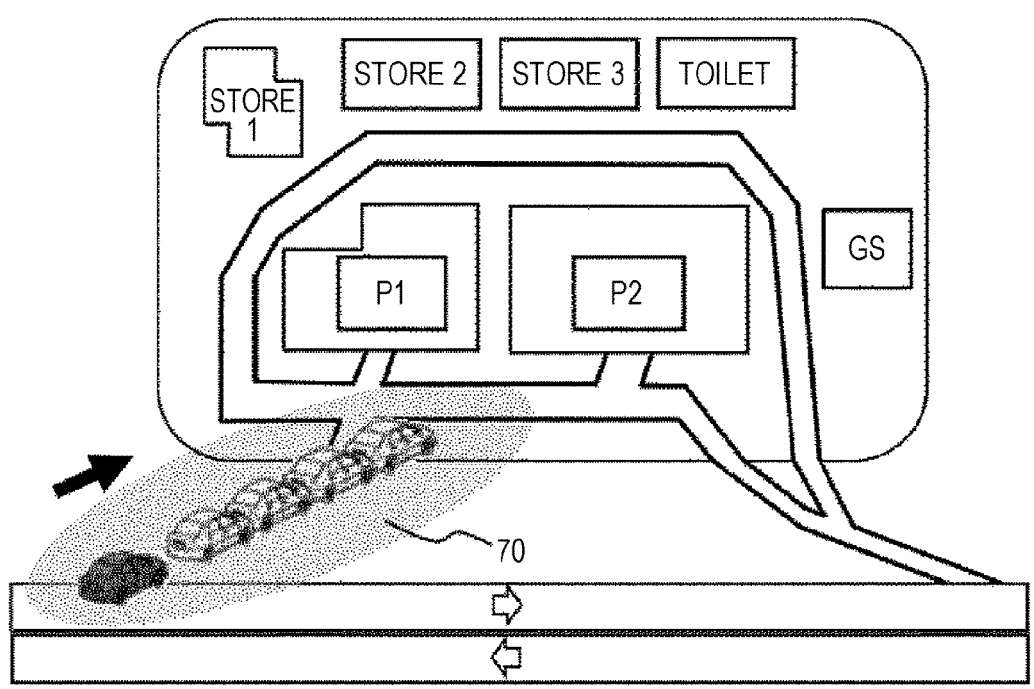
FIG. 7 is a diagram illustrating an example of leaving a car on a highway SA.

FIG. 7 is a diagram illustrating an example of leaving on a high way SA. Even when a parking queue 70 is generated in the service area or the parking area of the high way, the traveling location information is transmitted to the center to make a determination as to whether or not it is possible to leave the car. Here, it is possible to expect to improve the convenience of parking lot user, by transmitting the parking conditions such as the route of the utility facility in the service area, the staying time and the parking acceptable range to the center at the leavable position in advance by the parking lot user, and by automatically parking the car in the parking space that satisfies the conditions.

Figure 8:
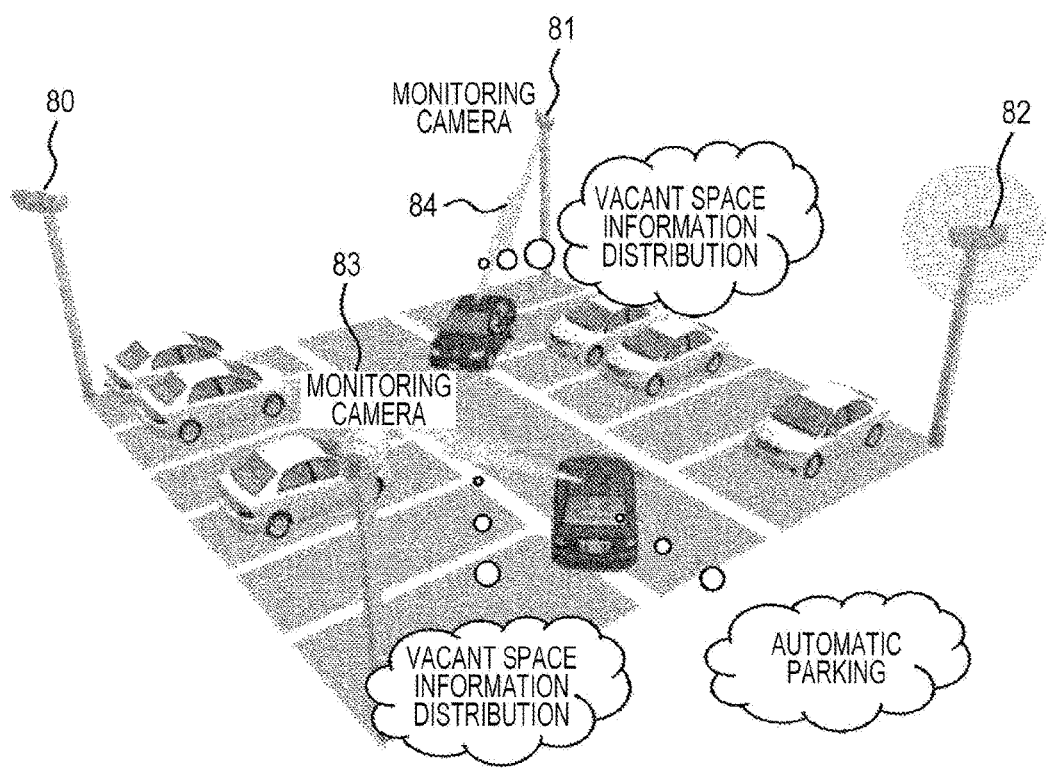
FIG. 8 is a diagram illustrating an example of a vacant space detection method.

FIG. 8 is a diagram illustrating an example of the vacant space detection method. As the vacant space detection method, the vacant space information of the parking lot is managed by the center by determining whether the parking space is parked or vacant for each parking space, using the monitoring cameras 80, 81, 82 and 83 installed in the parking lot in advance by image processing, and it is possible to appropriately distribute the open space information to the parking lot user. As another method, it is possible to similarly use a vacant space information detection method using the in-vehicle camera image described in the patent publication of JP-2015-076472-A.

FIG. 9 is a diagram illustrating an example of user facility migration information. The facility migration information accumulated in the facility migration information DB 15 records facility No. 91 in a time series manner, for example, when the user A migrates in the order of facility 1→5→3→8→6→4 for each parking lot user 90. Along with this, the parking position 92 actually parked is also recorded in association, an entering time 93, an exiting time 94, a staying time 95 and the like of the parking space are recorded so that it is possible to predict how long the parking lot user stays in next facility and to previously move the parking position.

Figure 10:
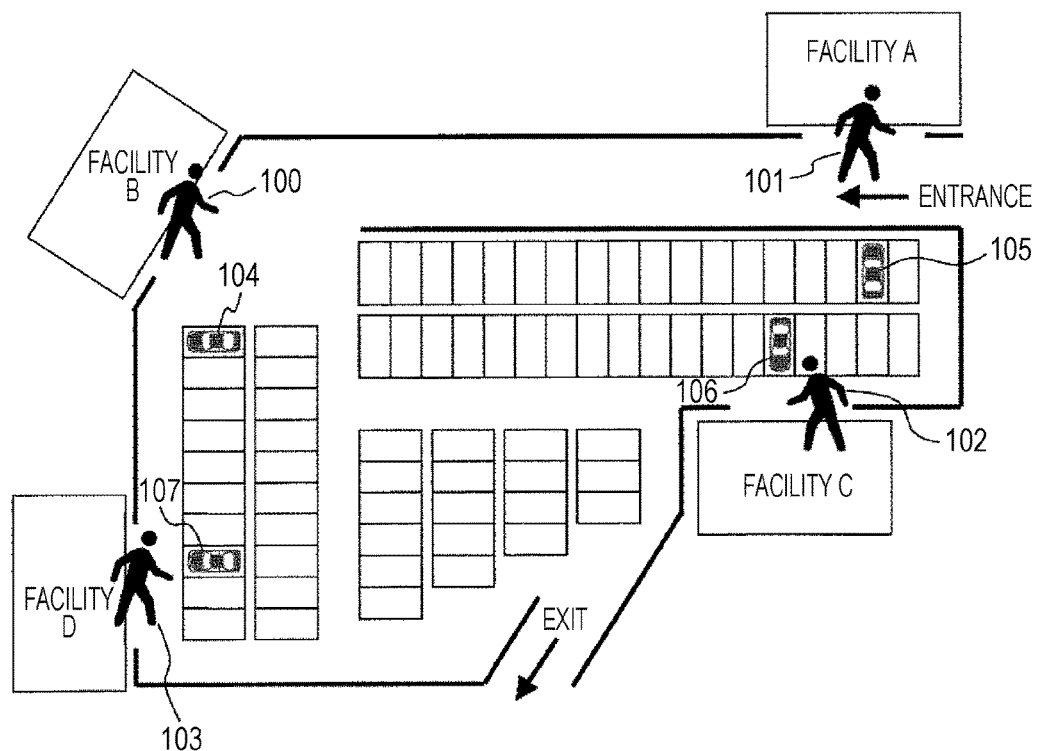
FIG. 10 is a diagram illustrating an example of automatic parking by the user migration.

FIG. 10 is a diagram illustrating an example of automatic parking based on the user migration. When a parking lot user 101, for example, uses a facility A, the user parks the car in a parking space 105 near the facility A. Similarly, when a parking lot user 100 uses a facility B, the user parks the car in a parking space 104 near the facility B. Since a parking lot user 102 of a facility C and a parking lot user 103 of a facility D park the car in parking spaces 106 and 107 near the facility respectively, the parking lot users always park the cars near the facility. Thus, since it is not necessary to purposely walk to the distant parking space after finishing the business, especially when moving with a lot of baggage, the movement distance becomes smaller, and convenience is improved.

According to the present invention as described above, a database having information which enables the auto valet parking has the parking lot map database DB1 which manages the route information to each parking space inside the parking lot, the vacant space information database DB2 which manages the full and vacant information for each parking space, and the facility migration information database DB3 which accumulates the facility migration information indicative of behaviors of parking lot user in the facility.

In addition, the auto valet parking system includes a first unit for detecting full and vacant information for each parking space, searching for a route to the parking space and automatically parking the car in the parking space based on the route information to the searched parking position; a second unit for notifying the parking lot user of information on the parking position through the mobile terminal; and a third unit for searching for the vacant space as close as possible to the condition based on the facility migration information of the parking lot user, and reflecting the vacant space on the first unit.

Among them, the first unit is achieved by cooperated operation of the vacant space determination processing unit 11 for detecting the full and vacant information for each parking space, using the information of the parking lot map database DB1 and the vacant space information database DB2, the parking position route searching unit 12 which searches for the route to the parking space, and the automatic parking unit 16 which automatically parks the car in the parking space based on the route information to the searched parking position.

The second unit is achieved by a parking position distribution unit (a user information input/output unit 17) which notifies the parking lot user of the parking position currently parked or the vacant space scheduled to be parked via the mobile terminal.

The third unit is achieved by cooperation of a vacant space searching unit 18 which searches for a vacant space as close as possible to the conditions based on the facility migration information requested in advance by the parking lot user, using the information of the facility migration information database DB3, and a use state determination unit 19 which collects the current position of the parking lot user, the migration route of the facility, the staying plan time, and the current user status information.

Further, the auto valet parking system includes a fourth unit for determining whether it is possible to leave the car when the parking lot user leaves the car on the road around the parking lot in order to enable leaving the car, and for guiding the car to the parking space by reflecting the determination on the first unit, when it is possible to leave the car. However, the fourth unit can be achieved by determining whether it is possible to leave the car in the leavable position determination unit 13 using the information of the facility migration information database DB3. Further, the fourth unit can be achieved by searching for a new vacant space and shifting to movement while operating on the vacant space determination processing unit 11 of the first unit.

What is claimed is:

1. An auto valet parking system for operating a car in a parking lot attached to a facility, the system comprising:
   a parking lot map database which manages route information to each parking space inside the parking lot;
   a vacant space information database which manages full and vacant information for each parking space;
   a facility migration information database which accumulates facility migration information indicative of behaviors of a parking lot user in the facility;
   a first unit which detects the full and vacant information for each parking space, searches for a route to the parking space and automatically parks the car in the parking space based on the route information to the searched parking position;
   a second unit which notifies the parking lot user of information on a parking position through a mobile terminal;
   a third unit which searches for the vacant space as close as possible to conditions based on the facility migration information of the parking lot user, and reflects the vacant space on the first unit; and
   a fourth unit which determines whether it is possible to leave a car when the parking lot user leaves the car on a road around the parking lot, and guides the car to the parking space by reflecting the determination on the first unit when it is possible to leave the car.

2. The auto valet parking system according to claim 1, wherein the facility migration information includes information set in advance by the parking lot user or information on a state of the parking lot user in the facility obtained via a mobile terminal.

3. The auto valet parking system according to claim 1, wherein the facility migration information includes a current position of the parking lot user, a migration route of the facility, a staying plan time, and current user status information.

4. The auto valet parking system according to claim 1, wherein, when arranged in a parking queue in a stage in which the parking lot user searches for a vacant space in at least a road which is not a public road around the parking lot facility or a passage inside the parking lot, the fourth unit requests currently traveling location information, desired parking position information, and the like to a center that manages the parking lot, determines whether or not it is possible to leave the car based on the request information at the center, and reports the determination result to the parking lot user.

5. The auto valet parking system according to claim 1, wherein the facility migration information accumulates status information such as during window shopping, during meals, during toilet and during break, during staying at each facility, with what kind of route and how long the parking lot user stays in the facility, the auto valet parking system using the information for search or data analysis by keywords registered in advance.

6. The auto valet parking system according to claim 1, wherein the second unit informs the parking lot user of the information on the parking position of the currently parked car and the parking position scheduled to be parked at a center which manages the parking lot, or when the parking lot user is not satisfied with the parking position presented from the center, the second unit transmits the change condition to the center.

7. The auto valet parking system according to claim 1, wherein the third unit searches for a current position of the parking lot user and the parking space near the facility to which the parking lot user is likely to move as a future migration route, based on the condition of the parking space requested by the parking lot user, and based on the facility migration information DB collected and accumulated when the user moved in the facility in the past.

8. The auto valet parking system according to claim 1, wherein the third unit automatically detects at least a current position in the facility, and a staying plan time or behavior status information within the facility of the parking lot user, or periodically notifies the information to a center which manages the facility by the parking lot user.

9. The auto valet parking system according to claim 1, wherein the fourth unit automatically parks the cars, by providing a dedicated lane and a parking area, when automatically parked cars and non-automatically parked cars coexist at a leavable position.

10. An auto valet parking method for operating a car in a parking lot additionally provided in a facility, the method comprising:
    holding a parking lot map database which manages route information to each parking space inside the parking lot, a vacant space information database which manages full and vacant information for each parking space, and a facility migration information database which accumulates facility migration information indicative of behaviors of a parking lot user in the facility;
    a first step which detects the full and vacant information for each parking space, searches for a route to the parking space and automatically parks the car in the parking space based on the route information to the searched parking position;

a second step which notifies the parking lot user of information on a parking position through a mobile terminal;

a third step which searches for the vacant space as close as possible to conditions based on the facility migration information of the parking lot user, and reflects the vacant space on the first step; and a fourth step which determines whether it is possible to leave a car when the parking lot user leaves the car on a road around the parking lot, and guides the car to the parking space by reflecting the determination on the first step when it is possible to leave the car.

* * * * *